United States Patent [19]
Price

[11] 3,875,913
[45] Apr. 8, 1975

[54] INTERNAL COMBUSTION ENGINES

[75] Inventor: Ronald Sheridan Price, Rugby, England

[73] Assignee: Chrysler United Kingdom Limited, London, England

[22] Filed: Mar. 23, 1973

[21] Appl. No.: 344,442

[30] Foreign Application Priority Data
Mar. 30, 1972 United Kingdom............ 15133/72

[52] U.S. Cl. .................... 123/119 A; 123/198 D
[51] Int. Cl. ........................................ F02n 25/06
[58] Field of Search........ 123/119 R, 119 A, 198 D, 123/198 R

[56] References Cited
UNITED STATES PATENTS

| | | | |
|---|---|---|---|
| 3,465,736 | 9/1969 | Daigh et al. | 123/119 A |
| 3,610,219 | 10/1971 | Sciabica | 123/119 A |
| 3,636,934 | 1/1972 | Nakajima | 123/119 A |
| 3,704,635 | 12/1972 | Eshelman | 123/198 D |

*Primary Examiner*—Manuel A. Antonakas
*Attorney, Agent, or Firm*—Edward F. Connors

[57] ABSTRACT

An internal combustion engine has a throttle controlled induction system and an exhaust system having a valve controlled feed back conduit connected to the induction system. The valve control is linked to the throttle control by a connection incorporating a limited force transmitting device so that if movement of the valve control is obstructed then the throttle control can move independently.

12 Claims, 7 Drawing Figures

INTERNAL COMBUSTION ENGINES

BACKGROUND OF THE INVENTION

1. Field of the Invention

This invention relates to internal combustion engines.

2. Description of the Prior Art

U.K. Pat. No. 1,264,656 discloses an internal combustion engine having a throttle controlled induction system, an exhaust system and a valve controlled feed back conduit from the exhaust system to the induction system. The valve control of the feed back conduit is connected to the throttle control so that the throttle control operates both the throttle in the induction system and the valve in the feed back conduit. When the throttle opening exceeds a predetermined amount the valve closes instantaneously automatically. Up to the point at which the valve closes automatically there is a rigid drive connection between the throttle control and the valve control. In order to avoid recirculation of gases when the engine is started from cold a separate thermally responsive valve is provided for closing off the feed back conduit until the engine reaches a minimum operating temperature.

There are two disadvantages in the above arrangement which the present invention seeks to overcome. Firstly it is necessary to provide a separate thermally responsive valve to close the feed back conduit for starting of the engine. Secondly if the valve in the feed back conduit should stick in an open position the throttle would be locked in the open position which could be dangerous.

SUMMARY OF THE INVENTION

The invention provides internal combustion engine having a throttle controlled induction system, an exhaust system, a valve controlled feed back conduit from the exhaust system to the induction system to feed products of combustion to fresh charge being fed to the engine and a limited force transmitting connection between said throttle control and the valve so that the valve is opened and closed in conjunction with the throttle and the throttle can operate independently of the valve if movement of the latter is prevented.

BRIEF DESCRIPTION OF THE DRAWINGS

The following is a description of some specific embodiments of the invention, reference being made to the accompanying drawings in which.

DESCRIPTION OF THE PREFERRED EMBODIMENT

Figure 1:
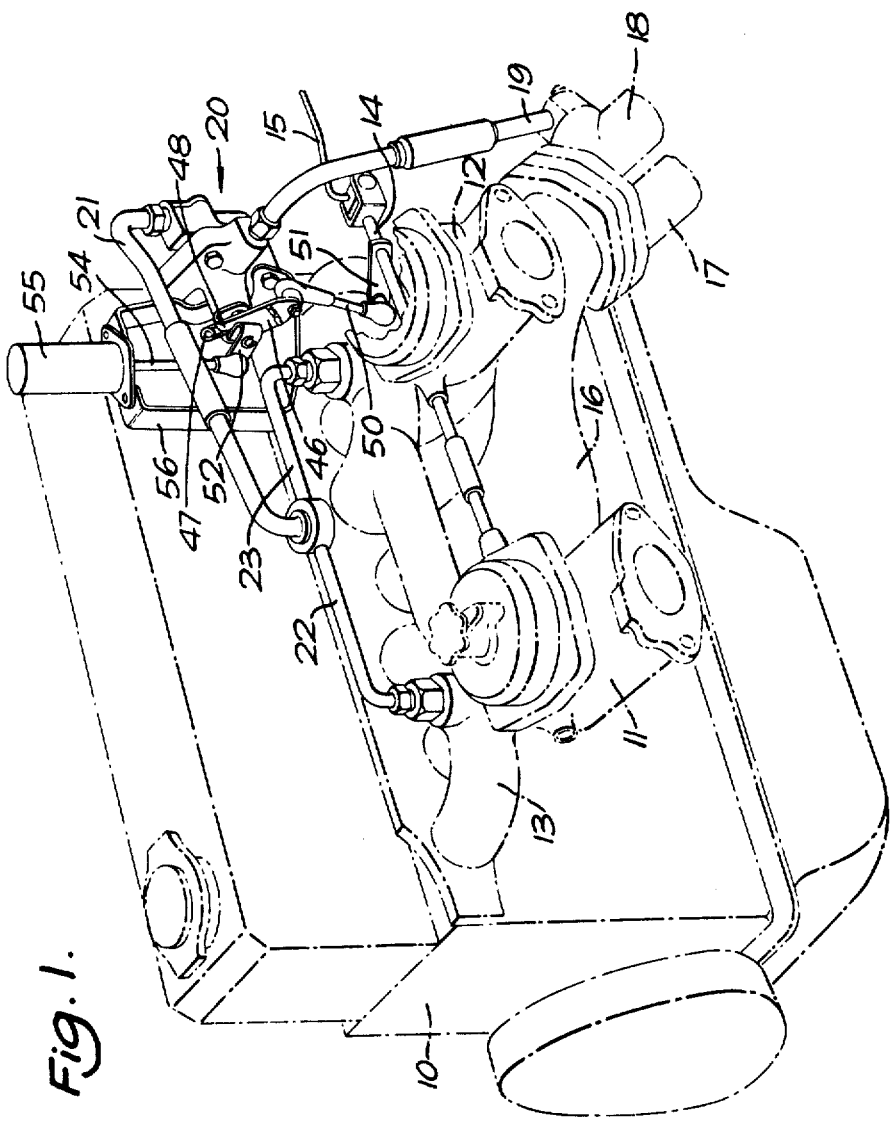
FIG. 1 is a perspective view of an internal combustion engine embodying the invention.
Figure 2:
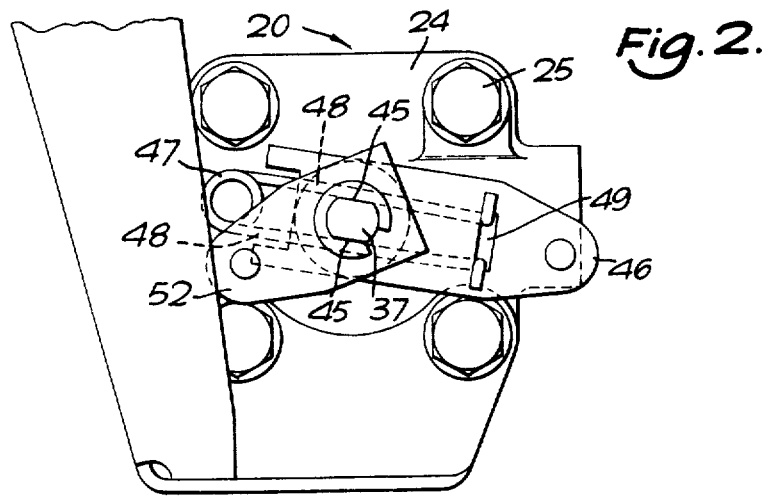
FIG. 2 is an end view of a valve and part of its operating mechanism of the engine of FIG. 1.
Figure 3:
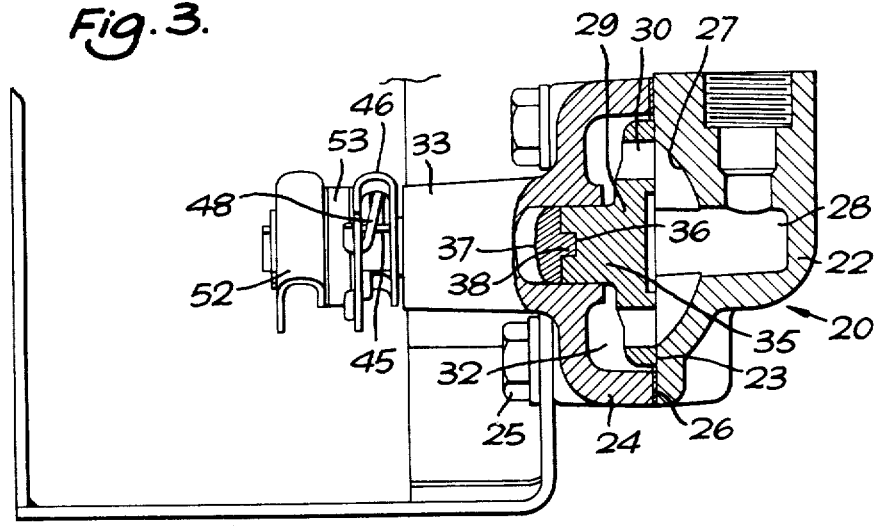
FIG. 3 is a side view of the arrangement shown in FIG. 2 with the valve shown in section.
Figure 5:
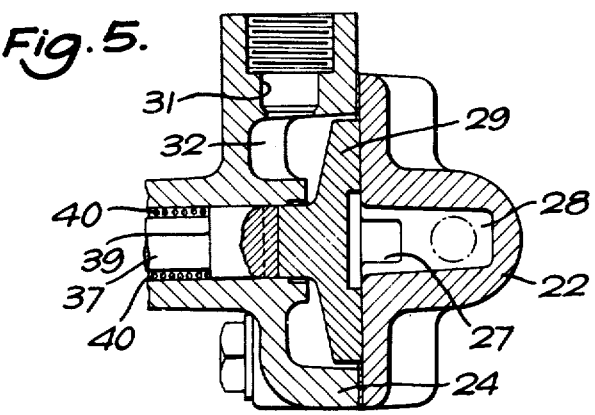
FIG. 5 is a section through the valve taken in a plane at right angles to that of FIG. 3.
Figure 4:
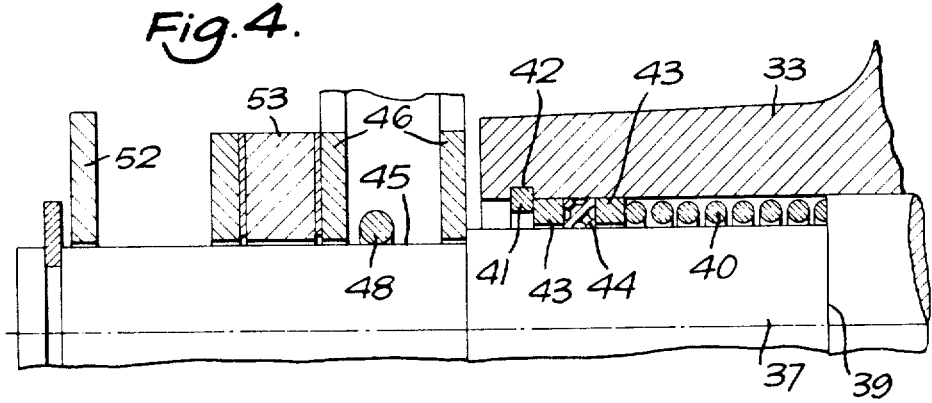
FIG. 4 is an enlarged view of part of the valve shown in FIG. 3.

Referring firstly to FIG. 1 of the drawings there is shown an internal combustion engine 10 having twin carburettors 11, 12 mounted on an induction manifold 13 secured to the cylinder head of the engine. The carburettors are controlled by a rotatable throttle spindle 14 connected to a linkage part of which is indicated at 15.

The engine has an exhaust manifold 16 which is connected to twin exhaust pipes 17, 18.

A conduit 19 is connected at one end to the exhaust pipe 18 and at the other end to an inlet side of a valve indicated generally at 20. The outlet side of the valve is connected to a conduit 21 which, in turn, is connected to two branch conduits 22, 23 which are connected to the inlet manifold 13 of the engine downstream of the two carburettors 11, 12 respectively. Thus a proportion of exhaust gases from the exhaust pipe 18 can be delivered to the fresh charge entering the engine cylinders. The exhaust gases do not take part in the combustion process but act as a heat sink to reduce the temperature reached during the combustion process and this reduces the formation of undesired nitrides of oxygen.

The valve 20 will now be described in greater detail with reference to FIGS. 2 to 5 of the drawings. The valve comprises a valve body comprising a first part 22 on which a valve seat 23 is formed and a second part 24 which is clamped to the periphery of the valve seat by bolts 25 with a gasket 26 between the part 24 and the valve seat to provide a leak-proof joint. The valve seat has a transversely extending slot 27 and an outlet passage 28 which extends from the slot 27 to an outlet port to which the conduit 21 is connected. The two parts 22, 24 of the valve body are formed from a temperature and corrosion resistant material such as Austenitic Iron or the inner surfaces of said parts are surface treated to provide temperature and corrosion resistance. A rotatable valve disc 29 formed from a ceramic or having a ceramic coating is located within the body part 24 and bears against the valve seat 23. The valve disc is formed with diametrically spaced apertures 30 which move into and out of register with the slot 27 by rotation of the disc. The body part 24 is formed with an inlet port indicated at 31 which is connected to the conduit 19 to deliver exhaust gases to the chamber 32 formed in the body part 24 behind the valve plate.

The body part 24 is formed with a boss 33 in which a spigot 35 on the rearward side of the valve plate engages. The spigot is formed with a cross slot 36 and a stainless steel spindle 37 located in the boss 33 has a tongue 38 which engages in the slot so that the spindle can rotate the valve plate. Part way along the spindle 37 there is a shoulder 39 facing outwardly of the boss and a coil spring 40 is compressed between the shoulder and a circlip 41 mounted in a groove 42 on the inner surface of the boss so that the spindle is forced into engagement with the spigot of the valve plate and the valve plate is in turn forced against the valve seat by the spring. Two washers 43 are located between the end of the spring and the circlip and an annular seal 44 is sandwiched between the washers to provide a gas tight seal between the spindle and boss.

The spindle 37 projects from the open end of the boss 33 and the projecting part of the spindle is formed with flats 45 on either side thereof. A lever 46 is mounted on the projecting portion of the spindle 37, the lever having a U-shaped end both sides of which have circular apertures through which the spindle passes so that the lever is freely rotatable on the spindle. A limited torque transmitting connection is provided between the lever 46 and the spindle by a coil spring 47 having arms 48 extending from either end thereof. The arms engage the flats on either side of the spindle and the free ends of the arms are engaged in a slot 49 formed in the lever, the extremities of the arms being turned outwardly to retain the ends of the arms in the slots. The length of the slot is such that the arms are firmly pressed against the flats on the spindle so that when the spindle is free to rotate the lever 46 can pivot the spindle and with it the valve plate 29. If however, the spindle is locked against rotation the arms 48 yield allowing the lever to pivot without the spindle. The lever 46 is connected by an adjustable length link 50 as shown in FIG. 1 to an end of a lever 51 secured to the rotatable throttle spindle 14 so that rotation of the throttle spindle also rotates the spindle 37 and with it the valve plate 29. In the specific arrangement illustrated the valve is open, that is the ports 30 in the valve plate are in register with the slot 27 in the valve seat over an arc of movement of the throttle spindle of 4° to 60° from the closed position which is intended to correspond to a vehicle speed of 20 to 70 miles an hour.

A further lever 52 is fixed to the end of the spindle 37 with a spacer washer 53 and anti-friction washers between the spacer washer and the levers 52 and 46. The lever 52, as can be seen in FIG. 1, is connected to an adjustable length rod 54 connected in turn to a movable core of an electric solenoid 55 mounted on a fixed bracket 56. The solenoid has a main "pull" coil and a subsidiary "hold" coil connected in parallel and is energised by an electrical circuit wired in parallel to the normal engine starter motor circuit so that operation of the starter motor switch first energises the main pull coil of the solenoid to retract the core within the solenoid thus rotating lever 52 and with it the spindle in a direction to close the valve. The hold coil is also energised to maintain the core in a retracted position and simultaneously the main pull coil is de-energised. The hold coil holds the spindle 37 against rotation so that the valve cannot open whatever throttle movements are made. The hold coil is de-energised when the starter switch is released. Thus there is no feed back of exhaust gases to the induction system of the engine during starting.

It will be appreciated that the action of rotation of the valve plate 29 over the slots 27 in the valve seat will tend to clean any deposits of matter from the exhaust gases from the abutting faces of the valve plate and valve seat. Further it will be understood that the induction manifold depression will be communicated to the valve plate 29 through the conduits 22, 23 and 21 to the valve plate 29 and will assist in holding the valve plate against the valve seat.

Figure 7:
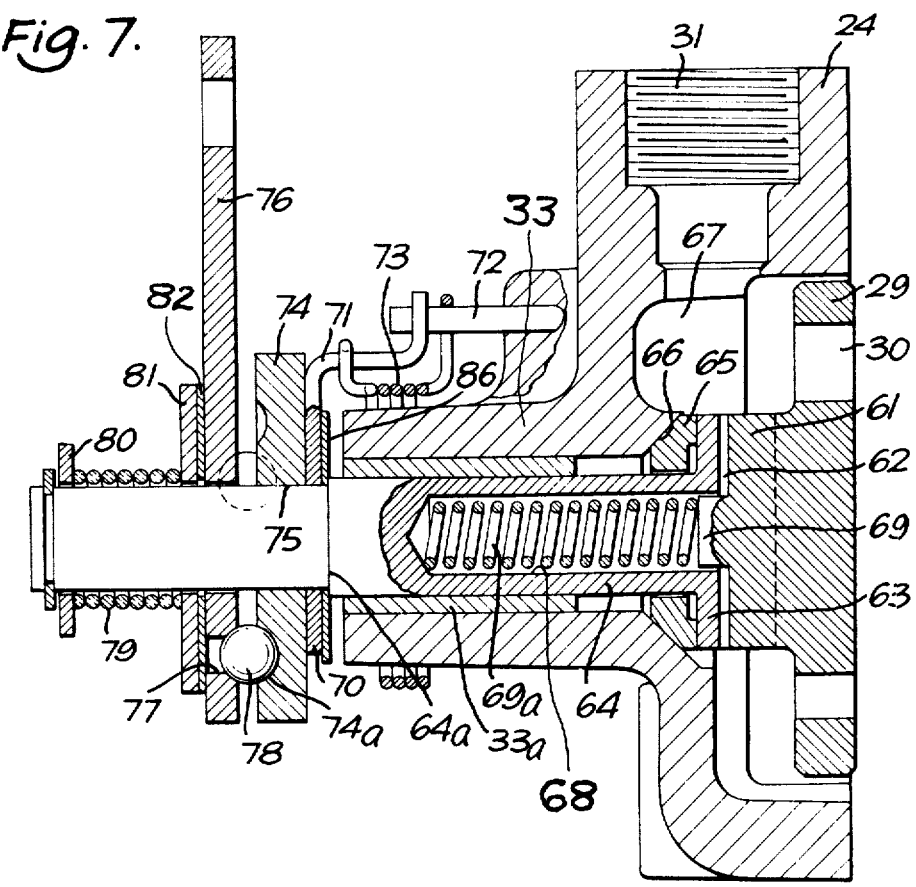
FIG. 7 is a sectional view of the further form of valve.
Figure 6:
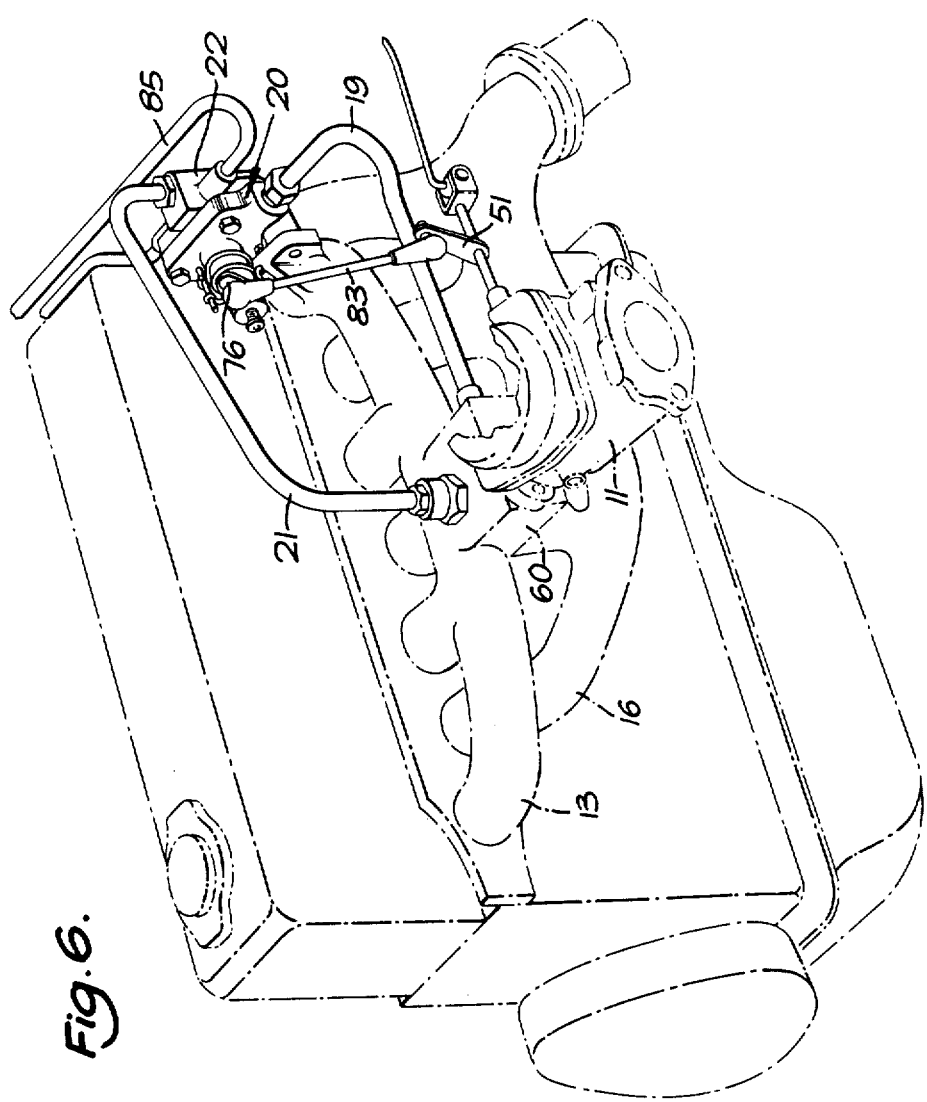
FIG. 6 is a perspective view of a further engine having a different form of valve.

FIGS. 6 and 7 show a similar arrangement to that described above and like parts have been allotted the same reference numerals. In this case however only a single carburettor 11 is provided and a hot spot device 60 is provided between the exhaust and induction systems so that a fresh charge passing through the induction system is heated by a portion of a exhaust gases exiting through the exhaust manifold. A conduit 19 is connectd to a part of the hot spot device through which exhaust gases flow and the conduit 21 is connected to the part of the hot spot device through which fresh charge flows. The construction of the valve 20 differs from that of the earlier embodiment and will now be described with reference to FIG. 7. The body portion 22 of the valve is similar to that described in the earlier embodiment and has been omitted. The valve has a rotatable valve plate 29 as in the earlier embodiment but on the rearward side of the valve plate 29 there is a projecting tongue 61 which engages in a slot 62 formed in a head 63 formed at one end of a spindle 64 which projects through the boss 33 of the housing part 24 and is supported in a bush 33a mounted in the boss. An annular carbon seal 65 encircles the spindle 64 and engages the head 63. The seal has a frusto-conical face 66 which engages a frusto-conical seat 67 formed at the end of the boss 33. A bore 68 extends into the spindle from the end at which the head is formed and a spigot 69 on the tongue 61 projects into the bore to locate the valve plate laterally with respect to the spindle. A compression spring 69a acts between the bottom of the bore and the spigot to force the valve plate 29 against the valve seat formed on the other part of the valve body and in so doing the head 63 of the spindle firmly clamps the seal 65 to the seat 67 to form a gas tight seal between the head 63 and the end of the boss to prevent escape of exhaust gases into the boss.

The projecting end of the spindle 64 carries a plate 70 having two circumferentially spaced projecting ears 71 (only one of which can be seen). A non-metallic washer 86 is locatd between the plate 70 and a shoulder 642 on the spindle to protect the plate from any exhaust gases escaping along the boss from the valve. The ears 71 are engageable with a stop 72 fixed to the body part 24 to prevent rotation of the spindle in either direction beyond the positions in which the valve is closed. A coil spring 73 encircles the boss 33 and acts between the stop 72 and one ear 71 to urge the spindle towards one limit of its movement in which the valve is closed in the position corresponding to the closed position of the throttle.

A different form of limited torque transmitting device is used in this case. The projecting part of the spindle 64 has a flat on one side and a plate 74 is mounted on the spindle having an aperture 75 which corresponds in shape to the cross-section of the spindle so that the plate rotates with the spindle. A lever 76 having a circular aperture is rotatably mounted on the spindle. The lever has three spaced apertures 77 in which balls 78 are located which engage in three part-spherical recesses 74a in the opposite face of the plate. The recesses are connected by a shallow annular groove in the face of the plate. The lever 76 is pressed towards the plate 74 by a compression spring 79 acting between a fixed stop 80 mounted at the end of the spindle and a washer 81 on the spindle which is spaced from the lever by an anti-friction washer 82. Thus the lever 76 is clamped to the plate 74 through the ball 78 so that when the spindle is free to rotate the lever 76 will rotate the spindle. The lever 76 as can be seen in FIG. 6 is connected by an adjustable length link 83 to the lever 51 on the throttle spindle so that rotation of the throttle spindle rotates the spindle 64 to open and close the valve as in the earlier described embodiment. If the valve should stick part way through its movement or the stop 72 is engaged by one or other of the ears 71 at either end of the movement of the spindle, then the balls 78 will ride out of their recesses 74a into the annular groove connecting the recesses thus allowing the lever 76 to pivot without rotating the spindle.

A modification to the body part 22 of the valve is shown in FIG. 6 of the drawings in which a passageway is provided through the body part for connection in a conduit 85 connected in series with the engine cooling system so that the coolant either cools or heats the valve body part.

It is also envisaged that a warning system to indicate abnormal operation of the valve and linkage assembly can be incorporated. Such a system could, for example, comprise an electric circuit incorporating a normally open switch which can be closed by two electrical contacts, one of which is located on the lever 76 and the other of which is located on the plate 74 or the plate 70 so that relative movement between the lever and the plate is signalled to the driver when the contacts are closed to operate a visual or audiole warning device. A thermally operated electrical switch can also be placed in series with said contacts to render the warning device inoperative until the engine or valve has reached a minimum operating temperature.

I claim:

1. An internal combustion engine having:
   a throttle controlled induction system;
   an exhaust system;
   a valve controlled feed back conduit from the exhaust system to the induction system to feed products of combustion to fresh charge being fed to the engine;
   positive drive means between the throttle control and valve for moving the valve from a closed position to initially open the valve and subsequently to move the valve to a further closed position in response to opening of the throttle control, and a limited force transmitting means connected in said positive drive means whereby any obstruction to opening or closing of the valve causes breakdown of the positive drive means permitting the throttle control to be operated independently; and,
   means to stop movement of the valve beyond the closed positions thereof, movement of the throttle control beyond such positions being permitted by the limited force transmitting connection.

2. An engine as claimed in claim 1 wherein means are provided for holding the valve in the closed position in response to a starting operation of the engine.

3. An engine as claimed in claim 2 wherein the means for holding the valve closed comprise a solenoid operatively connected to the valve control to hold the valve closed when the solenoid is energised, said solenoid being connected in a circuit for a starter motor for the engine so that the solenoid is energised when the starter motor is operated.

4. An engine as claimed in claim 1 wherein the valve is arranged to be opened and then closed over a part of the throttle opening corresponding to a vehicle speed of 20 to 70 miles per hour.

5. An internal combustion engine having:
   a throttle controlled induction system,
   an exhaust system,
   a valve controlled feed back conduit from the exhaust system to the induction system to feed products of combustion to fresh charge being fed to the engine, positive drive means between the throttle control and valve for positively opening and positively closing the valve in response to opening and closing of the throttle control respectively,
   a limited force transmitting means connected in said positive drive means whereby any obstruction to opening or closing of the valve causes breakdown of the positive drive means permitting the throttle control to be operated independently,
   said valve comprising a valve body,
   a circular valve seat in the valve body having an outlet port therein,
   a rotatable valve disc having at least one aperture therein engaging the valve seat, means to press the valve disc against the valve seat and means to connect said drive means to the valve disc to rotate the disc with respect to the seat with movement of the drive means to bring the aperture in the disc into and out of register with the outlet port in the seat to open and close the valve.

6. An engine as claimed in claim 5 wherein the positive drive means includes a lever connected to the throttle control, the rotatable valve disc has a spindle to effect rotation thereof and the lever has an opening through which the spindle extends, there being at least one spring element supported on the lever and pressing against a flat formed on the spindle so that movement of the lever rotates the spindle and when the valve is held against movement the spring element permits the lever to rotate with respect to the spindle.

7. An engine as claimed in claim 6 wherein a coil spring is provided having outwardly extending elements at both ends thereof which are held on the lever and pressed against flats on either side of the spindle.

8. An engine as claimed in claim 5 wherein the positive drive means includes a lever connected to the throttle control, the rotatable valve disc has a spindle to effect rotation thereof and the lever has an opening through which the spindle extends, there being a plate fixed to the spindle adjacent the lever having a plurality of part spherical recesses spaced around the side thereof in which balls are located and the lever having corresponding apertures to receive said balls and spring means being provided between the spindle and lever to press the lever towards said plate so that the balls form a driving connection between the lever and plate which will permit the lever to move independently of the plate if the valve disc is held against rotation.

9. An engine as claimed in claim 5 wherein the valve seat has a slot extending across the seat to form the valve port and the disc has two diametrically spaced apertures which register with the slot in the open position of the valve.

10. An engine as claimed in claim 5 wherein the valve body and valve disc are formed from temperature resistant materials to withstand hot exhaust gases.

11. An engine as claimed in claim 10 wherein the valve body is formed from Austenitic iron and the valve disc is formed from a ceramic material.

12. An engine as claimed in claim 5 wherein the engine has a cooling system and the valve body has a passage and means to connect said passage to the engine cooling system.

* * * * *